(12) United States Patent
Cho

(10) Patent No.: US 9,067,155 B2
(45) Date of Patent: Jun. 30, 2015

(54) VARIABLE FILTRATION DEVICE

(76) Inventor: Hyun Cheul Cho, Gyeongsangnam-do (KR)

(*) Notice: Subject to any disclaimer, the term of this patent is extended or adjusted under 35 U.S.C. 154(b) by 437 days.

(21) Appl. No.: 13/392,711

(22) PCT Filed: Apr. 28, 2010

(86) PCT No.: PCT/KR2010/002675
§ 371 (c)(1),
(2), (4) Date: Feb. 27, 2012

(87) PCT Pub. No.: WO2011/025124
PCT Pub. Date: Mar. 3, 2011

(65) Prior Publication Data
US 2012/0152819 A1    Jun. 21, 2012

(30) Foreign Application Priority Data

Aug. 27, 2009 (KR) .................. 10-2009-0079783

(51) Int. Cl.
| | |
|---|---|
| *B01D 29/15* | (2006.01) |
| *B01D 29/66* | (2006.01) |
| *B01D 29/64* | (2006.01) |
| *B01D 29/68* | (2006.01) |

(52) U.S. Cl.
CPC ............ *B01D 29/15* (2013.01); *B01D 29/6453* (2013.01); *B01D 29/66* (2013.01); *B01D 29/684* (2013.01); *B01D 2201/186* (2013.01)

(58) Field of Classification Search
CPC .... B01D 29/15; B01D 29/6543; B01D 29/66; B01D 29/684; B01D 2201/186
USPC ......... 210/387, 391, 400, 401, 409, 410, 411, 210/412
See application file for complete search history.

(56) References Cited

U.S. PATENT DOCUMENTS 5,112,485 A * 5/1992 Hirs ............................... 210/387
5,209,841 A * 5/1993 Bratten ......................... 210/107

FOREIGN PATENT DOCUMENTS

| JP | 07-313816 | 12/1995 |
|---|---|---|
| JP | 08-117778 | 5/1996 |
| JP | 08-290017 | 5/1996 |
| JP | 10-216419 | 8/1998 |
| JP | 2005-081286 | 3/2005 |

OTHER PUBLICATIONS

Machine-generated English translation of JP 08-290017, generated on Feb. 20, 2015.*
International Search Report for PCT/KR2010/002675 Mailed on Jan. 31, 2011.

* cited by examiner

*Primary Examiner* — Fred Prince
(74) *Attorney, Agent, or Firm* — Revolution IP, PLLC

(57) ABSTRACT

Provided is a filtration device used in order to improve the water quality of the final effluent in an advanced treatment facility for sewage and wastewater. The variable filtration device (10) of this type comprises a filtration tank (20), a filtration unit (30), a winding unit (50) and a filter cloth (12) arranged in such a way that the filtration conditions can be controlled by adjusting the number of turns of winding and the extent of pulling of the filter cloth in the chamber where the filtered water is formed, thereby allowing relatively easy porosity control as compared with the prior art, so enabling ready adjustment to the target water quality and water quantity even when the quality of the inflowing water varies.

2 Claims, 2 Drawing Sheets

VARIABLE FILTRATION DEVICE

RELATED APPLICATIONS

This application is a 371 application of International Application No. PCT/KR2010/002675, filed Apr. 28, 2010, which in turn claims priority from Korean Patent Application No. 10-2009-0079783, filed Aug. 27, 2009, each of which is incorporated herein by reference in its entirety.

TECHNICAL FIELD

The present invention relates to a variable filtration device and in particular to a variable filtration device characterized in that a filtration device used so as to enhance the quality of the final effluent in an advanced water treatment facility for sewage and wastewater uses a fiber yarn as a filter medium, and a fiber yarn is applied in the form of a filtration cloth, thus reliably filtering inflowing water.

BACKGROUND ART

As a modern industrial society advances, a city area expands, so a water contamination problem among numerous environment problems becomes a key factor which might consequently threaten the future of mankind. As a way of overcoming the above problems, a contamination substance discharge permission criteria is being reinforced, and a biological or physicochemical, advanced treatment facility is increasingly used. In particular, various types of filtration devices are proposed and used in order to enhance the quality of final effluent in the advanced treatment facility for sewage and wastewater.

Among the most widely used methods in terms of the filtration device, there are the Korean patent registration publication numbers 0121118 "FILTERING APPARATUS OF SEPTIC TANK", the registration number 10-0438150 "Back Fresh Method Using Influent Water Head and Filter Apparatus Employing the Same", the registration number 10-0479476 "for reusing waste water using drum filter and vortex filter", and the registration utility model publication number 20-0222527 "Filtering device of wastewater having multi filtering layer therein", in each of which filtration devices, the filtration layer is formed of inorganic particle substances such as sand, anthracite, activated carbon, clay, ground magnetite, garnet, inactive medium or something, thus filtering inflowing water.

The above conventional filtration device however is disadvantageous because a collection space of underwater particles is limited to a water surface portion as compared with an installation area, and since it is equipped with a fixed porosity structure depending on the characteristic of a filter medium, a porosity decrease in a filtering layer and a porosity clogging problem often occur due to the floating substances in underwater. The above filtration device increases pressure head loss due to a filtration resistance, which consequently causes a flow channeling phenomenon, a break-through phenomenon, etc., so a reverse washing frequency and a reverse washing amount increase in the filter medium of a filtration layer. The filtration speed is low because the filtration pressure is large due to the filled filter medium, and the filter medium might be leaked during reverse washing.

Some filtration devices using a fiber yarn as a filter medium are disclosed so as to improve the problems encountered in the above filtration devices. There are Korean patent publication numbers 1997-0007944 "APPARATUS OF FILTRATION", the patent registration number 10-0241198 "VARIABLE PORE MICRO FILTER", the Korean patent number 10-0324727 "Separating apparatus of suspended solid in liquid solution using flexible fiber", the Korean patent number 10-0354836 "Apparatus for filtering suspended solid in water", the Korean patent number 10-0362594 "Pore Size Controllable Filter", etc.

Since the above filtration devices are difficult to control pores when forming pores by controlling a fiber yarn, it is difficult to randomly adjust water quality and water amount when the quality of inflowing water varies. Besides, the conventional filtration devices have problems maintaining an adhering force between fiber yarns.

DISCLOSURE OF INVENTION

Accordingly, the present invention improves the problems in terms of the conventional art, and it is an object of the present invention to provide a new type of a variable filtration device which makes it possible to easily adjust water quality and amount even when the quality of inflowing water varies, in such a manner to control the pores in a relatively easier way as compared with the conventional art.

It is another object of the present invention to provide a new type of a variable filtration device which makes it possible to make a pore control easier and to maximize convenience in terms of an installation and maintenance in such a way that filtration cloths the various kinds of which are available can be used as a filter medium for a proper water retreatment under various environments.

It is another object of the present invention to provide a new type of a variable filtration device which can effectively perform a reverse washing process which was one of the hard-to-overcome problems of the conventional art using fiber yarns.

To achieve the above objects, according to the features of the present invention, there is provided a variable filtration device, comprising a filtration tank 20 having a cavity 21 which stores inflowing water; a filtration unit 30 which has a chamber 32 along an outer side of which a filtration hole 33 allowing a filtration water passage 31 of an inner side to communicate with the outside is formed, with the chamber 32 being positioned in the cavity 21 of the filtration tank 20, with the filtration unit 30 being installed in the filtration tank 20 so that the chamber 32 can rotate in a set direction by means of an external driving force; a winding unit 50 which has a roller 52 arranged to match with the chamber 32 of the filtration unit 30 in the cavity 21 of the filtration tank 20 and is installed in the filtration tank 20 so that the roller 52 can rotate in a set direction by means of an external driving force; and a filtration cloth 12 of which one end is coupled to the chamber 32 of the filtration unit 30, and the other end of which is coupled to the roller 52 of the winding unit 50 and is wound on or unwound from the chamber 32 by means of the rotations of the chamber 32 and the roller 52 in a state that the filtration cloth 12 is wound on the roller 52 by a set length, wherein the inflowing water stored in the cavity 21 of the filtration tank 20 is filtered by means of the filtration cloth 12 as the filtration cloth 12 wound on the chamber 32 is adjusted, and the filtration water stored in the filtration water passage 31 of the chamber 32 is discharged to the outside.

In the variable filtration device according to the present invention, the roller 52 of the winding unit 50 comprises a washing water passage 51 formed in the interior, and a washing hole 53 formed along its outer side in order to allow the washing water passage 51 and the outside to communicate with each other, thus allowing a reverse washing water to come into and out of the outside during a reverse washing operation.

In the variable filtration device according to the present invention, there is further provided an auxiliary washing unit 70 which is installed between the chamber 32 of the filtration unit 30 and the roller 52 of the winding unit 50 and is close to the filtration cloth 12, thus allowing the reverse washing water supplied from the outside to be sprayed toward the filtration cloth 12.

In the variable filtration device, the filtration unit 30 comprises a rotation shaft 36 which is coupled to one side of the chamber 32 and is extended toward the outside of the filtration tank 20, thus coming into contact with an actuator installed at an outer side of the cavity 21, and a discharge shaft 34 which is coupled to the other side of the chamber 32 at the opposite side of the rotation shaft 36 and is extended toward an outer side of the filtration tank 20, thus communicating with the filtration water passage 31 of the chamber 32, thus forming a discharge passage of filtration water.

Advantageous Effects

According to a variable filtration device according to the present invention, since a fiber yarn can be used in various forms of filtration cloths, a pore control which was a problem in the conventional art can be easily performed while obtaining the advantages of the conventional art using fiber yarns. The pore control can be relatively easily performed as compared with the conventional art in such a way that filtration cloths which are currently used in various forms can be used as a filtration medium, thus achieving a proper water treatment under various environments, and a filtration condition can be controlled by adjusting the turns that a filtration cloth is wound on a chamber producing a filtration water, and the pulling level, so it is possible to easily control water quality and amount in a desired way even when the quality of inflowing water varies. Besides, the variable filtration device according to the present invention can implement in various forms a reverse washing which was the biggest problem in a conventional filtration device using fiber yarns, thus effectively preventing the lowering of a filtration efficiency the problem of which used to occur due to floating substances.

BRIEF DESCRIPTION OF THE DRAWINGS

The present invention will become better understood with reference to the accompanying drawings which are given only by way of illustration and thus are not limitative of the present invention, wherein.

BEST MODES FOR CARRYING OUT THE INVENTION

Figure 1:
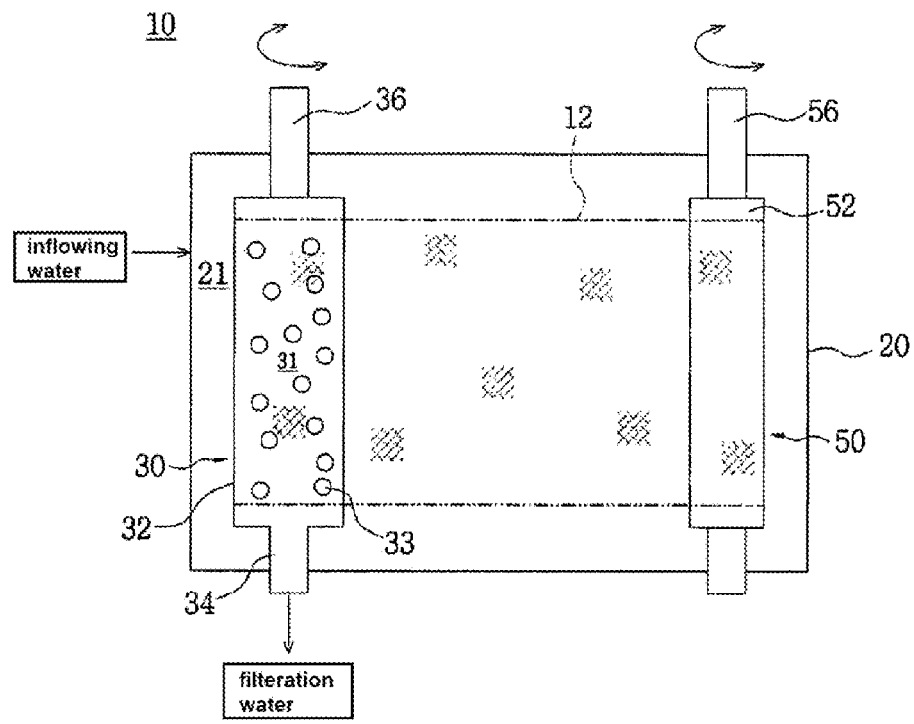
FIG. 1 is a view for explaining a variable filtration device according to a technical concept of the present invention.

The preferred embodiments of the present invention will be described in detailed with reference to FIGS. 3 and 4, and the same technical elements of FIGS. 1 through 4 will be given the same reference numerals. The illustrations and detailed descriptions on the constructions which can be easily understood by an ordinary person skilled in the art of a common filtration device and its operations and effects can be simplified or omitted, and instead the key matters related to the present invention will be described in details.

Figure 3:
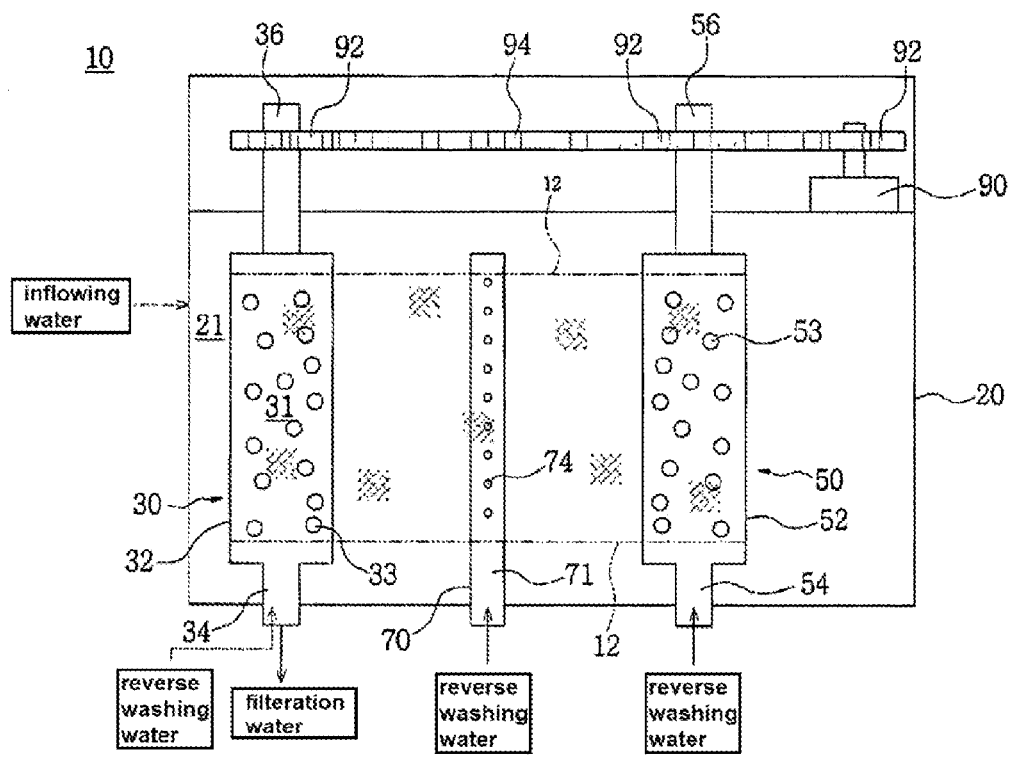
FIG. 3 is a view for explaining a variable filtration device according to a preferred embodiment of the present invention.
Figure 4:
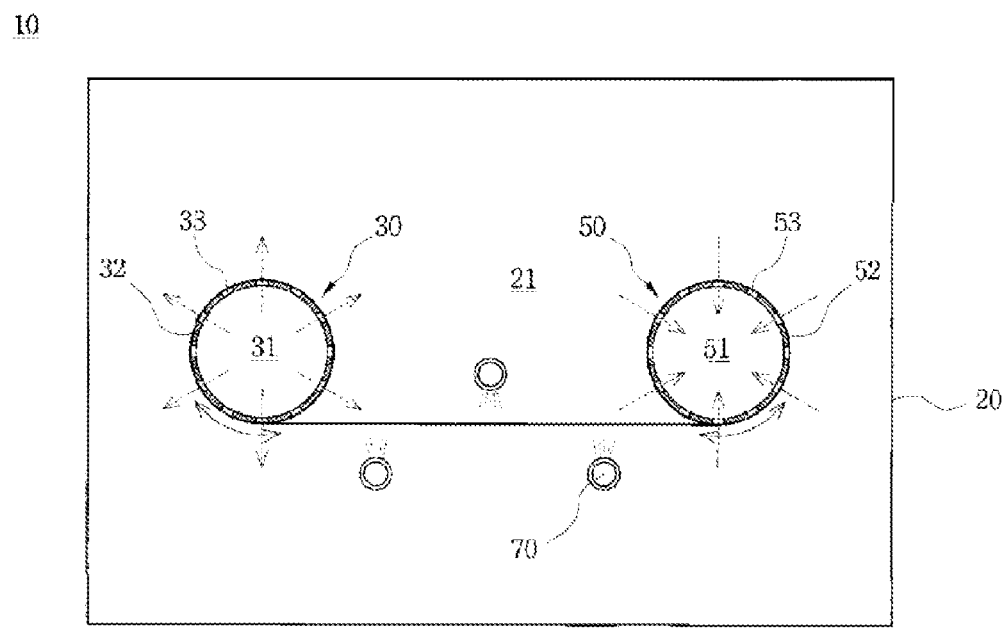
FIG. 4 is a schematic view illustrating a planar structure of key elements of a variable filtration device according to a preferred embodiment of the present invention.

FIG. 3 is a view for explaining a variable filtration device according to a preferred embodiment of the present invention, and FIG. 4 is a schematic view illustrating a planar structure of key elements of a variable filtration device according to a preferred embodiment of the present invention. In particular, FIG. 4 is a view illustrating an example of a reverse washing process of a variable filtration device according to a preferred embodiment of the present invention.

As shown in FIGS. 3 and 4, the variable filtration device 10 according to the present preferred embodiment is characterized in that a fiber yarn is used as a filter medium in the form of a filtration cloth, and the filtration condition can be controlled by adjusting the turns that a filtration cloth 12 is wound on a chamber 32 producing filtration water and the pulling of the same.

The variable filtration device 10 according to the present embodiment comprises a filtration cloth 12, a filtration tank 20, a filtration unit 30, a winding unit 50, and an auxiliary washing unit 70. The inflowing water stored in a cavity 21 of the filtration tank 20 can be filtered by the filtration cloth 12 by adjusting the filtration cloth 12 wound on the chamber 20 of the filtration unit 30, and the filtration water stored in the filtration water passage 31 of the chamber 32 is discharged to the outside.

In more details, the filtration tank 20 according to the present embodiment forms a cavity 21 for storing inflowing water. The variable filtration device 10 according to the present embodiment is characterized in that the filtration unit 30 and the winding unit 50 are arranged in a direction vertical to each other, so a service space helping install a driving element driving the filtration unit 30 and the winding unit 50 is formed at the top of the cavity 21. The service space is installed separately from the cavity 21.

The filtration unit 30 has a chamber 32 along an outer side of which a filtration hole 33 allowing the filtration water passage 31 of the inner side to communication with the outside is formed. The filtration unit 30 is installed so that the chamber 32 can be positioned in the cavity 21 of the filtration tank 20. The chamber 32 is installed in the filtration tank 20 for a rotation in a set direction by means of the driving force of the motor 90 which is installed in the service space of the filtration tank 20. A rotation shaft 36 is installed at the filtration unit 30 in the present embodiment. The rotation shaft 36 is coupled at one side of the chamber 32 and is extended to the outer side of the filtration tank 20, thus finally being couple to the motor 90 which is an actuator installed at the outer side of the cavity 21. There is provide a discharge shaft 34 which is coupled to the other side of the chamber 32 at the opposite portion to the rotation shaft 36 and is extended to the outer side of the filtration tank 20 and communicates with the filtration water passage 31 of the chamber 32, thus forming a discharge passage of the filtration water. The rotation shaft 36 and the discharge shaft 34 are directed to rotating the chamber 32 with a relatively simpler structure, thus discharging the filtration water to the outside. Another structure known in the art can be adapted for the same purpose.

The winding unit 50 has a roller 52 disposed corresponding to the chamber 32 of the filtration unit 30 in the cavity 21 of the filtration tank 20 and is installed at the filtration tank 20 so that the roller 52 can rotate in the set direction by means of an external driving force. In the present embodiment, the winding unit 50 has a structure similar with the filtration unit 30. In other words, the washing water passage 51 is formed at the roller 52 of the winding unit 50, and a washing hole 53 is formed along its outer surface while allowing the washing water passage 51 to communicate with the outside. The winding unit 50 is coupled to one side of the roller 52 and is extended to the outer side of the filtration tank 20, thus being provided with the rotation shaft 56 coming into contact with the motor 90 which is an actuator installed at an outer side of the cavity 21. There is provided a discharge shaft 54 which is coupled to the other side of the roller 52 at the opposite portion to the rotation shaft 56 and is extended to the outer side of the filtration tank 20, thus forming a discharge passage of washing water during a reverse washing as it communicates with the washing water passage 51 of the roller 52.

The construction of the winding unit 50 helps effectively perform a washing process of the filtration cloth. The operation of the common filtration device generally has a filtration process and a washing process. When the filtration process keeps going on, the pores of the filtration cloth 12 are gradually filled with floating substances, and filtration resistance increases, so the process reaches a state that the filtration process is no longer performed. The present embodiment is characterized in that clean reverse washing water, air or something are injected into the filtration unit 30 and/or the winding unit 50, thus effectively eliminating the floating substances collected by the pores of the filtration cloth 12.

The variable filtration device 10 according to the present invention is directed to achieving the input and output of the reverse washing water from the outside during the reverse washing with the aid of the construction of the winding unit 50. The filtration device 10 according to the present embodiment is directed to inputting a reverse washing water through both the filtration unit 30 and the winding unit 50, thus reverse-washing the filtration cloth 12, and at the same time as shown in FIG. 4, it is directed to performing the washing process with respect to the filtration cloth 12 wound by one turn on the filtration unit 30 or the filtration unit 30 by supplying reverse washing water to one unit (in FIG. 4, the filtration unit 30) of the same and is directed to discharging washing water to the other unit (in FIG. 4, the winding unit 50) of the same (in this case, the above process is performed while the filtration cloth 12 is wound on the filtration unit 30).

Therefore, the filtration device 10 according to the present embodiment is advantageous to perform a reverse washing with an inflowing water for filtration treatment being in the cavity 21 by including the filtration unit 30, the winding unit 50, the auxiliary washing unit 70, and the discharge part which is not shown in the drawing and separately installed, and is also advantageous to have an effective reverse washing with an inflowing water in the cavity 21 being discharged.

The filtration unit 30 and the winding unit 50 according to the present embodiment are configured to identically rotate by one motor 90 installed in the service space of the filtration tank 20. The above driving mechanism can be implemented by a sprocket 92 and a chain 94. The pulling level of the filtration cloth 12 according to the present embodiment can be determined at the time the filtration unit 30 and the winding unit 50 are installed or can be determined by making adjustable the distance between the filtration unit 30 and the winding unit 50.

The variable filtration device 10 according to the present embodiment includes an auxiliary washing unit 70 for enhancing a washing effect of the filtration cloth 12. The auxiliary washing unit 70 is installed close to the filtration cloth 12 between the chamber 32 of the filtration unit 30 and the roller 52 of the winding unit 50, thus allowing externally supplied reverse washing water to be sprayed toward the filtration cloth 12. In other words, the reverse washing conducted by the filtration unit 30 and the winding unit 50 is applied to reversely washing the filtration cloth 12 which is once wound on the chamber 32 and the roller 52; however the auxiliary washing unit 70 can be advantageously implemented during the transportation of the filtration cloth 12 or the work.

The variable filtration device 10 according to the present embodiment includes an interruption unit which prevents the filtration cloth 12 wound on the winding unit 50 from being exposed into the inflowing water in the cavity 21 so as to effectively prevent the clogging of the filtration cloth 12 the problem of which used to occur due to the attachment and growth of microorganisms in a biological treatment facility of sewage and wastewater. The interruption unit allows the filtration cloth 12 to be wound on the winding unit 50 while the cover sheet made from the same material like a plastic material is being overlapped on an outer side of the filtration cloth 12, and it is separated when the filtration cloth 12 is unwound from the winding unit 50, and then the filtration cloth 12 is wound on the interruption unit. So, microorganism is prevented from attaching and growing and floating substances are prevented from attaching as the filtration cloth 12 is wound on the winding unit 50 (in a state that the filtration cloth 12 does not work as compared to the filtration unit 30 which works filtration process). The driving operation of the interruption unit is performed by receiving the driving force from the motor 90 like the filtration unit 30 and the winding unit 50; however it can be performed by adapting a certain mechanism (for example, a spring device) which provides a tensional force in the direction that the cover sheet is wound on the interruption unit.

As described above, the variable filtration device according to the preferred embodiment of the present invention has been described with along with the above descriptions and drawings; however the disclosed contents are provided for the purpose of just descriptions, so various modifications and amendments are possible within the scopes of the technical concepts of the present invention by those who skilled in the art.

Modes for Carrying Out the Invention

Figure 2:
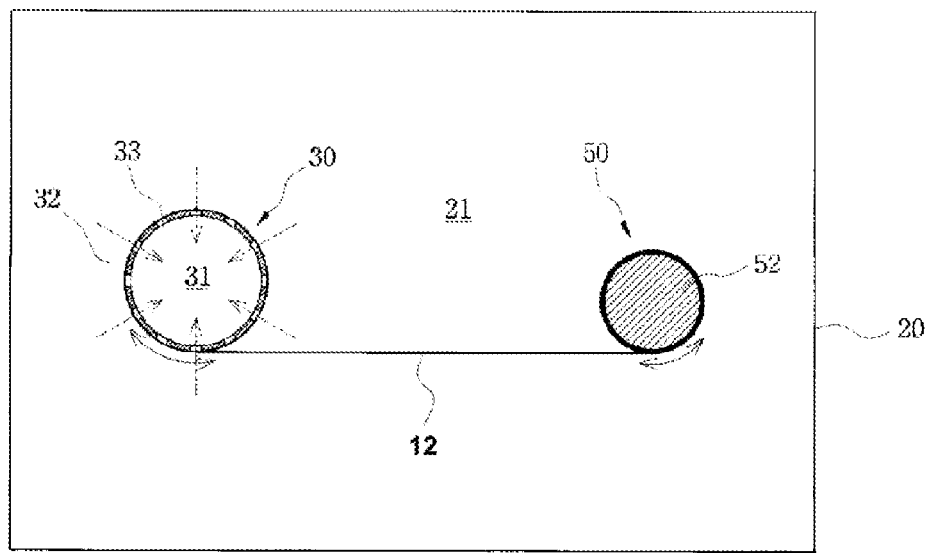
FIG. 2 is a schematic view illustrating a planar structure of a variable filtration device of FIG. 1.

FIGS. 1 and 2 are views illustrating the technical concepts of the variable filtration device according to the present invention, of which FIG. 1 is a view for explaining the variable filtration device according to the technical concept of the present invention, and FIG. 2 is a schematic view illustrating a planar structure of the variable filtration device of FIG. 1.

As shown in FIGS. 1 and 2, the variable filtration device 10 according to the present invention is characterized in that a fiber yarn is made in the form of the filtration cloth and is used as a filtering medium, and the filtration condition can be controlled by adjusting the turns that the filtration cloth is wound on the chamber producing filtration water and the pulling level.

The variable filtration device 10 according to the present invention comprises a filtration tank 20, a filtration unit 30, a winding unit 50 and a filtration cloth 12 and is characterized in that the inflowing water stored in the cavity 21 of the filtration tank 20 is filtered by the filtration cloth 12 while adjusting the filtration cloth 12 wound on the chamber 20 of the filtration unit 30, and the filtration water stored in the filtration water passage 31 of the chamber 32 is discharged to the outside.

The filtration tank 20 has a cavity 21 for storing inflowing water. The filtration tank 20 includes a pipe line for supplying inflowing water, a pipe line for discharging filtration water to the outside, a valve for controlling the flux and flow of each pipe line, a construction for supporting key elements of the present invention, a construction for movably supporting the filtration unit 30 and the winding unit 50, and various construction such as a sensor, a gauge and a controller (control panel) for an automatic operation. The above constructions can be applied from the conventional filtration device which uses a fiber yarn as a filtering medium and the technologies related with a common sewage and wastewater treatment field, so the detailed descriptions thereof will be omitted.

The filtration unit 30 includes a chamber 32 along an outer side of which a filtration hole 33 is formed, which filtration hole 33 allows the filtration water passage 31 of the inner side to communicate with the outside. The filtration unit 30 is installed in such a way that the chamber 32 is positioned in the cavity 21 of the filtration tank 20 and is installed in the interior of the filtration tank 20 in such a way that the chamber 32 can move in a set direction by means of an external driving force. The winding unit 50 includes a roller 52 arranged to match with the chamber 32 of the filtration unit 30 in the cavity 21 of the filtration tank 20 and is installed in the filtration tank 20 in such a way that the roller 52 can move in a set direction by means of an external driving force. Here, the arranged relationship of the filtration unit 30 and the winding unit 50 is not limited to the disclosures of the drawings; namely, in the drawings of the present invention, there has been shown a structure that the filtration unit 30 and the winding unit 50 are arranged vertically to the filtration tank 20. In the variable filtration device 10 according to the present invention, the filtration unit 30 and the winding unit 50 can be adapted to a horizontal structure arrangement. Here, the filtration unit 30 and the winding unit 50 cannot have a horizontal arrangement, the arrangement of which is determined based on the efficiency of the filtration process and the applicability of the space. In particular, the filtration unit 30 according to the present invention is necessarily submerged under inflowing water; however the winding unit 50 might be arranged not to be submerged under inflowing water.

When the filtration unit 30 and the winding unit 50 are installed in the filtration tank 20, they are rotatably supported by various bearings or something and preferably have a sealing structure by applying a mechanical seal or something. The rotations of the filtration unit 30 and the winding unit 50 can be arranged to rotate together with the chamber 32 of the filtration unit 30 and the roller 52 of the winding unit 50 with the aid of a chain driving method (or gear driving method like the preferred embodiment of the present invention; however the above driving design is not limited thereto. For example, when it is possible to control the filtration condition by only adjusting the turns that the filtration cloth is wound on the chamber 32, it is preferred that the filtration unit 30 and the winding unit 50 are coupled to one actuator (motor); however when various filtration conditions are needed to be provided, the pulling level of the filtration cloth 12 can be controlled by adjusting the strength (pulling level) generated as the filtration cloth 12 is wound on the chamber 32 of the filtration unit 30 in such a way to adjust the distance between the filtration unit 30 and the winding unit 50. The driving design, rotation support structure and sealing structure of the filtration unit 30 and the wining unit 50 can be known to those who skilled in the art from the related technologies, so the detailed descriptions thereof will be omitted.

One end of the filtration cloth 12 is coupled to the chamber 32 of the filtration unit 30, and the other end of the same is coupled to the roller 52 of the winding unit 50, and the filtration cloth 12 is wound on or unwound from the chamber 32 by means of the rotations of the chamber 32 and the roller 52, with the filtration unit 12 being previously wound on the roller 52 by a certain length. The filtration cloth 12 might be selected from various kinds of filtration cloths which are available having a water treatment function under various environments. For example, various filtration cloths are disclosed in Korean patent registration publication number 10-0227126 "method of manufacturing conductible filter", Korean patent publication number 2001-0000801 "High Density Filter cloth with synthetic Fiber Yarn", Korean patent publication number 10-2004-0056938 "MANUFACTURING METHOD OF FILTRATE MEDIA FOR SLUDG-EELECTRODEWATERING SYSTEM", and Korean patent registration number 10-0824214 "Filtrate Media for high-tension molding". The present invention can selectively choose from various filtration cloths depending on a user's or designer's demand. In the present invention, the filtration cloth 12 represents that a fiber yarn (here the fiber yarn is not limited to its material) is formed in the form of a filtration cloth and represents a woven type in a certain structure and a type that a fiber yarn is arranged in a dense structure.

Industrial Applicability

The present invention can be applied to a filtration device which is generally used for the filtration of the final effluent, the tidal current at a water intake place, lake water, and the filtration of other contamination substances, the filtration of cooling water and circulation water at a steel mill, the filtration of agricultural and industrial water, the filtration of discharge water at a water purification plant, and the filtration of overflowing water of sewage and wastewater.

The invention claimed is:

1. A variable filtration device, comprising:
a filtration tank having a cavity which stores inflowing water;
a filtration unit which has a chamber along an outer side of which a filtration hole allowing a filtration water passage of an inner side to communicate with the outside is formed, with the chamber being positioned in a cavity of the filtration tank, with the filtration unit being installed in the filtration tank so that the chamber can rotate in a set direction by means of an external driving force;
a winding unit which has a roller arranged to match with the chamber of the filtration unit in the cavity of the filtration tank and is installed in the filtration tank so that the roller can rotate in a set direction by means of an external driving force; and
a filtration cloth of which one end is coupled to the chamber of the filtration unit, and the other end of which is coupled to the roller of the winding unit and is wound on or unwound from the chamber by means of the rotations of the chamber and the roller in a state that the filtration cloth is wound on the roller by a set length, wherein the inflowing water stored in the cavity of the filtration tank is filtered by means of the filtration cloth as the filtration cloth wound on the chamber is adjusted, and the filtration water stored in the filtration water passage of the chamber is discharged to the outside,
wherein said roller of the winding unit comprises a washing water passage formed in the interior, and a washing hole formed along its outer side in order to allow the washing water passage and the outside to communicate with each other, thus allowing a reverse washing water to come into and out of the outside during a reverse washing operation; and
an auxiliary washing unit which is installed between the chamber of the filtration unit and the roller of the winding unit and is close to the filtration cloth, thus allowing the reverse washing water supplied from the outside to be sprayed toward the filtration cloth.

2. The variable filtration device according to claim 1, wherein said filtration unit comprises a rotation shaft which is coupled to one side of the chamber and is extended toward the outside of the filtration tank, thus coming into contact with an actuator installed at an outer side of the cavity, and a discharge shaft which is coupled to the other side of the chamber at the opposite side of the rotation shaft and is extended toward an outer side of the filtration tank, thus communicating with the filtration water passage of the chamber, thus forming a discharge passage of filtration water.

* * * * *